US012463367B2

(12) United States Patent
Büttemeyer et al.

(10) Patent No.: US 12,463,367 B2
(45) Date of Patent: Nov. 4, 2025

(54) CONTACT ELEMENT FOR PRINTED CIRCUIT BOARD PLUG CONNECTOR

(71) Applicant: HARTING Electric Stiftung & Co. KG, Espelkamp (DE)

(72) Inventors: Jana Büttemeyer, Rahden (DE); Gert Havermann, Wallenhorst (DE); Marc Genau, Lübbecke (DE); Dieter Rose, Rahden (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 369 days.

(21) Appl. No.: 18/024,621

(22) PCT Filed: Sep. 27, 2021

(86) PCT No.: PCT/DE2021/100780
§ 371 (c)(1),
(2) Date: Mar. 3, 2023

(87) PCT Pub. No.: WO2022/068996
PCT Pub. Date: Apr. 7, 2022

(65) Prior Publication Data

US 2024/0030641 A1 Jan. 25, 2024

(30) Foreign Application Priority Data

Sep. 29, 2020 (DE) ..................... 10 2020 125 437.7
Dec. 21, 2020 (DE) ..................... 10 2020 134 330.2

(51) Int. Cl.
*H01R 13/28* (2006.01)
*H01R 12/57* (2011.01)

(52) U.S. Cl.
CPC ............ *H01R 13/28* (2013.01); *H01R 12/57* (2013.01)

(58) Field of Classification Search
CPC ................................ H01R 13/28; H01R 12/57
USPC .......................................................... 439/884
See application file for complete search history.

(56) References Cited

U.S. PATENT DOCUMENTS 2,591,437 A 4/1952 Haugsrud
5,098,311 A * 3/1992 Roath .................. H01R 12/714 439/291
5,181,855 A * 1/1993 Mosquera .......... H01R 12/7005 439/291
5,730,613 A * 3/1998 Yamada ................ H01R 24/84 439/293

(Continued)

FOREIGN PATENT DOCUMENTS

CH 260408 A 3/1949
DE 19809881 A1 9/1999

(Continued)

*Primary Examiner* — Harshad C Patel
(74) *Attorney, Agent, or Firm* — Smartpat PLC

(57) ABSTRACT

An electric contact element for use in a printed circuit board plug connector is formed with at least two opposing narrow faces and at least two opposing wide faces. At least one narrow face is designed to be used as a contact surface in order to be brought into an electrically conductive connection with a counter contact element. At least the contact surface of the contact element and of the counter contact element are designed to have identical structures, and the wide face has at least one rigid region and a flexible region.

10 Claims, 2 Drawing Sheets

(56) References Cited

U.S. PATENT DOCUMENTS

| | | | | |
|---|---|---|---|---|
| 6,159,021 | A * | 12/2000 | Kusuhara | H01R 12/716 439/74 |
| 6,540,529 | B1 | 4/2003 | Yu | |
| 7,473,104 | B1 * | 1/2009 | Wertz | H05K 7/1069 439/66 |
| 7,510,445 | B2 * | 3/2009 | Tokunaga | H01R 13/28 439/600 |
| 7,798,859 | B1 * | 9/2010 | Yang | H01R 13/2442 439/733.1 |
| 8,998,645 | B2 * | 4/2015 | Vanaleck | H01R 24/84 439/626 |
| 9,252,517 | B2 * | 2/2016 | Kimura | H01R 12/85 |
| 10,673,158 | B2 * | 6/2020 | Aoki | H01R 13/11 |
| 2008/0064229 | A1 * | 3/2008 | Tokunaga | H01R 13/28 439/59 |
| 2009/0047816 | A1 | 2/2009 | Lappoehn | |
| 2009/0197440 | A1 * | 8/2009 | Hirata | H01R 12/57 439/83 |
| 2010/0167569 | A1 * | 7/2010 | Stoner | H01R 13/193 439/284 |
| 2011/0045679 | A1 * | 2/2011 | Yu | H01R 12/716 439/74 |
| 2019/0363491 | A1 * | 11/2019 | Suzuki | H01R 13/405 |

FOREIGN PATENT DOCUMENTS

| | | | |
|---|---|---|---|
| DE | 10043400 | A1 | 3/2002 |
| EP | 0777306 | A1 | 6/1997 |
| EP | 2026417 | B1 | 8/2014 |
| JP | H0249373 | A | 2/1990 |
| JP | H0778647 | A | 3/1995 |
| JP | H0973959 | A | 3/1997 |
| WO | 9428599 | A1 | 12/1994 |

* cited by examiner

CONTACT ELEMENT FOR PRINTED CIRCUIT BOARD PLUG CONNECTOR

TECHNICAL FIELD

The disclosure related to a contact element for printed circuit board plug connectors. Such contact elements are designed to establish an electrically conductive connection to contact elements that are fundamentally identical in construction. Such contact elements are often referred to as "hermaphroditic" because they can be connected to themselves or to contact elements of identical/similar construction, and plug connectors are usually named "male" and "female", wherein male and female contact elements are pluggable together.

BACKGROUND

One advantage of hermaphroditic contact elements is that they have improved signal integrity compared to conventional male-female contact pairs. With hermaphroditic contact pairs, a STUB effect can be prevented, which negatively affects frequencies and thus data rates due to resonances that occur. A hermaphroditic contact pair is therefore in essence more suitable for transmitting higher frequencies/data rates.

Another advantage is that their design, depending on the plug connector, basically only has to be worked out once. This means that they can be produced in a single design in twice as large quantities as contact elements of different designs.

U.S. Pat. No. 8,998,645 B2 discloses an electrical connection system for electrical plug connectors in which the contacts are identical for both the male and female sides of the connection. The contacts are positioned in a linear arrangement in a dielectric grid. This arrangement results in a low-cost construction with the potential for high electronic data transmission.

A disadvantage of the proposed embodiment is on the one hand the increased spatial requirement, particularly in relation to its width, and on the other hand the limited adjustability of the mating forces, resulting from the alignment of the contacts. The contacts are designed to make contact with the broad sides of the contacts. In this case, the broad sides mean the sides of a contact which are made, for example, from a sheet or a coil from the planar area when the contact is manufactured, while the narrow sides are understood to be the sides resulting from the material thickness of the sheet or coil.

The German Patent and Trade Mark Office has searched the following prior art in the priority application for the present application: EP 2 026 417 A2, U.S. Pat. No. 6,540,529 B1, DE 198 09 881 A1, WO 94/28599 A1, DE 100 43 400 A1 and CH 260 408 A.

SUMMARY

The problem addressed by the invention is to provide a space-saving, cost-effective and yet safe contacting alternative to contact elements from the prior art. The problem is solved by the subject matter of the independent claims.

An electrical contact element for use in a printed circuit board plug connector is formed with at least two opposing narrow sides and at least two opposing broad sides. At least one narrow side here has at least one contact surface and at least one contact crest arranged on a contact tip. The contact surface is designed here to be brought into electrically conductive connection by at least one contact crest of an at least substantially structurally identical contact element. The contact crest of the contact element is likewise brought into electrically conductive connection with the contact surface of an at least substantially structurally identical contact element. The contact element further has at least one rigid region and one flexible region. The sides that result from the material thickness of a transport unit, for example the material thickness of a coil, a sheet or a strip, are considered to be narrow sides. A wide side thus results from the manufacturing method of the contact element, for example a laser cutting process, a punching process, or other known processes. For use in printed circuit board plug connectors, a material with a thickness of less than or equal to 0.5 mm is usually used. In particular, material thicknesses of less than or equal to 0.25 mm are advantageously used to connect to printed circuit boards. Accordingly, a contact surface is to be understood as a surface which is formed at the edge of a manufacturing process along the thickness of the material. A contact element according to the disclosure thus falls into the category of a "hermaphroditic" contact element. This means that a contact element according to the disclosure can be brought into electrically conductive connection with contact elements of the same or at least comparable design. The special feature here is the unusual design of the flexible region. This is not determined by the material thickness, as is usually the case, but by the shaping of the contact element. This means that the contact element does not deform elastically orthogonally to a plane which is formed substantially by the transport unit from which the contact element was formed, as is the case with conventional contact elements. Instead, the contact element according to the disclosure is shaped in such a way that the contact element is substantially elastically deformed in this plane in order to establish contact with an at least similarly formed contact element.

In a further embodiment, at least one narrow side is machined at least along part of the contact surface using a mechanical, surface-treating process. This means that the surface of the contact element has a lower surface roughness due to mechanical treatment. Furthermore, it means that the contact element obtains a better defined, or definable, contact surface at least at the treated regions. This lower surface roughness has a beneficial effect on the contact surface of the contact element with a contact element to be contacted, so that the contact surfaces establish a defined and thus reliable contact with one another.

One embodiment provides that at least one narrow side of the contact element is machined by a forming process at least along the contact region. Consequently, after the forming process, for example punching or lasering, a contact element is post-processed by a process such as rolling, pressing or similar processes in order to obtain the previously mentioned defined contact surface. Particularly preferred here is the processing of at least one narrow side at least along part of the contact surface by the process of pressure polishing.

An alternative embodiment provides that at least one narrow side of the contact element is machined at least along the contact region by a machining process. Due to the small size of the contacts according to the disclosure, grinding and/or vibratory finishing processes seem particularly suitable. Other machining processes are conceivable, provided that the machines used have a sensible or suitably designed material holder.

In an advantageous embodiment, the flexible region has a contact tip at the end arranged opposite the rigid region, wherein the contact tip has a geometric deformation, in particular a curvature. The defined, protruding contact tip allows the contacting of the hermaphroditic contact elements to be determined even better. Part-circular curvatures are preferred here, but protrusions with substantially angular geometry are also conceivable and may possibly be used advantageously.

In a further developed embodiment, at least part of the contact tip is machined using a mechanical, surface-treating process. Processes comparable to those provided for the contact surface are conceivable here.

In one embodiment, at least part of the rigid region adjacent to the flexible region is provided with a recess. This recess is arranged on the narrow side opposite the contact surface. As a result, the contact surface remains unaffected, but the flexible region of the contact element is enlarged. This recess can therefore be used to adjust the plug-in force of a plug connector with the contact element according to the disclosure.

An expedient embodiment provides that the rigid region has a soldering region at the end arranged opposite the flexible region. This region can be designed in various embodiments for angled plug connectors. This allows the advantageous contact element according to the disclosure to be used in a variety of ways.

In a clever embodiment, the rigid region and the soldering region are delimited from each other by a protrusion. This protrusion can be formed as a stop or latching element. In the field of electronic plug connectors, a similar protrusion is often referred to as a "harpoon". This ensures a secure seating of the contact element in a housing of a printed circuit board plug connector.

Advantageous embodiments of the invention are given in the dependent claims and the following description.

BRIEF DESCRIPTION OF THE DRAWINGS

An exemplary embodiment of the invention is shown in the drawings and is explained in greater detail below.

DETAILED DESCRIPTION

The figures contain partially simplified, schematic depictions. Sometimes, identical reference signs are used for like but possibly non-identical elements. Different views of like elements could be scaled differently. Directional indications such as "top", "bottom", "left", "right", "front" and "rear" refer to the respective depictions and may vary in relation to the elements shown.

Figure 1:
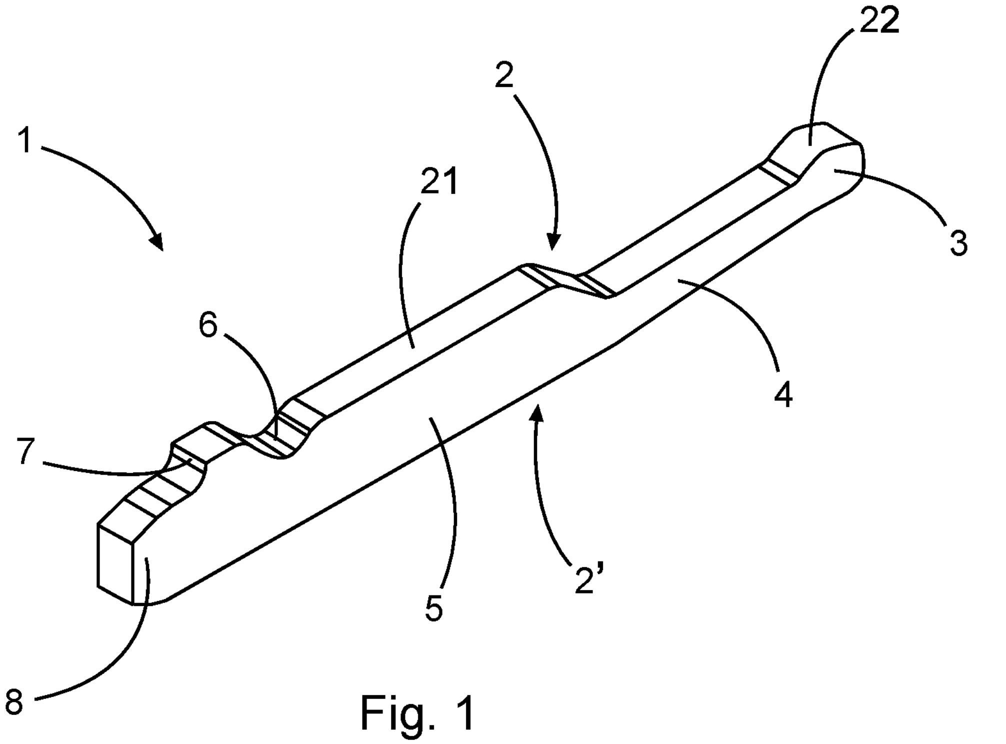
FIG. 1 shows a perspective depiction of a contact element.

FIG. 1 shows an embodiment of a contact element 1. Here, the preparation of the contact element 1 becomes clear. The narrow sides 2 and 2' are opposite each other, wherein the narrow side 2 is provided for making contact with a similar contact element 1' or 1" or an identical contact element 1. Furthermore, it can be seen that the contact element 1 is provided with a contact tip 3, which is integrally formed on a flexible region 4. The flexible region 4 merges into a rigid region 5. The rigid region in turn has a concavity 6. Looking from the rigid region 5 to the concavity 6, the concavity 6 is followed by a protrusion 7 used as a stop, or latching hook, which basically separates the rigid region 5 from a soldering region 8. The concavity 6 allows a more definable amount of force to be applied during mechanical finishing, for example pressure polishing. The soldering region 8 is introduced into a printed circuit board with 0.8 mm contact spacing and is connected on a solder pad in an integrally bonded manner. The narrow side 2 further has a contact surface 21 and contact crest 22. The contact crest 22 is associated here with the contact tip 3 and is designed to enter into an electrically conductive connection with the contact surface 21 of a further contact element 1, 1' or 1".

Figure 2:
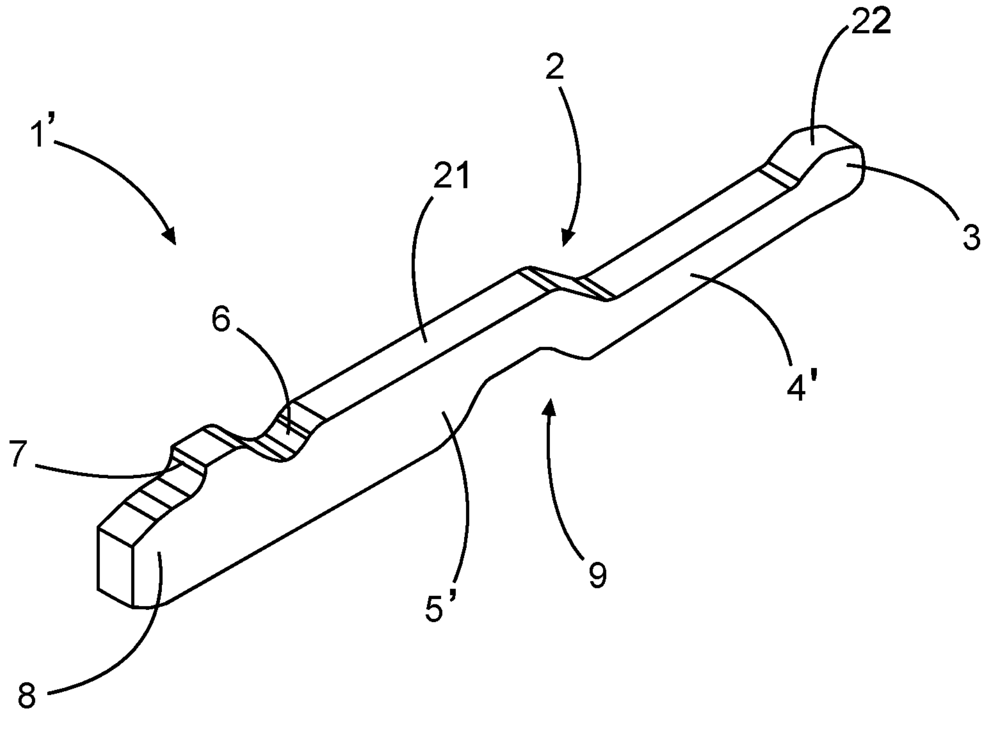
FIG. 2 shows a perspective depiction of an alternative contact element.

In FIG. 2, a similarly constructed contact element 1' is shown, which differs by an additional recess 9 along the narrow side 2'. This recess 9 extends the flexible region 4 without reducing the contact surface 21 of the narrow side 2. This increases the flexibility of the contact element 1'. Accordingly, the rigid region 5' is shortened in comparison to the rigid region 5 shown in FIG. 1.

Figure 3:
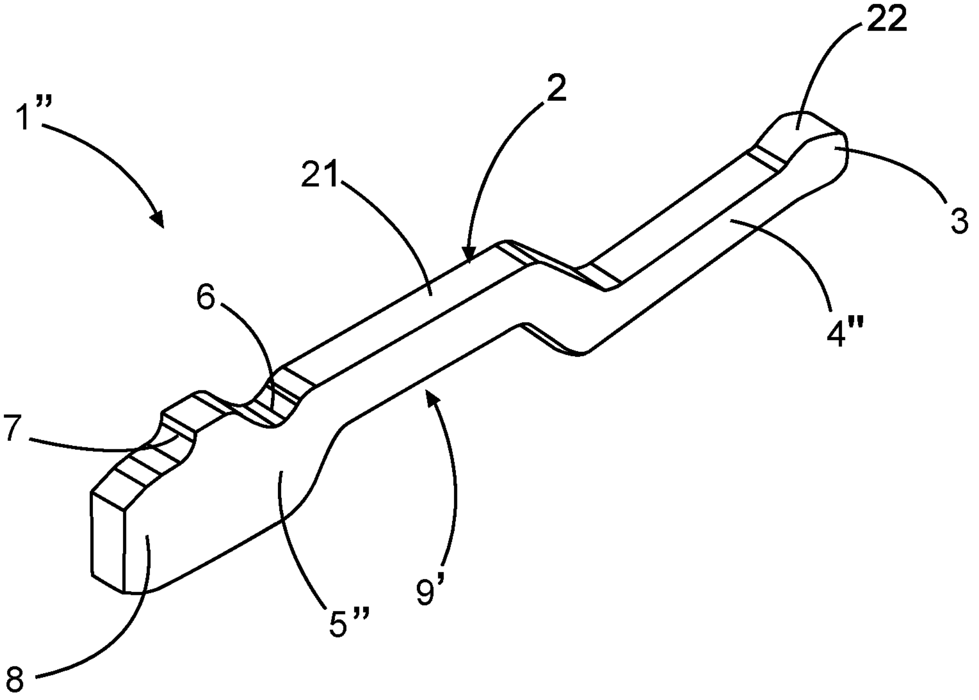
FIG. 3 shows a perspective depiction of a further, alternative contact element.

In FIG. 3, the recess 9' in the contact element 1" is maximized, and correspondingly the rigid region 5" is reduced to a minimum. As a result, the flexibility of the flexible region 4 is improved, which directly affects the plug-in forces that occur during a plugging operation of a "female" plug connector 10 with a "male" plug connector 11.

Figure 4:
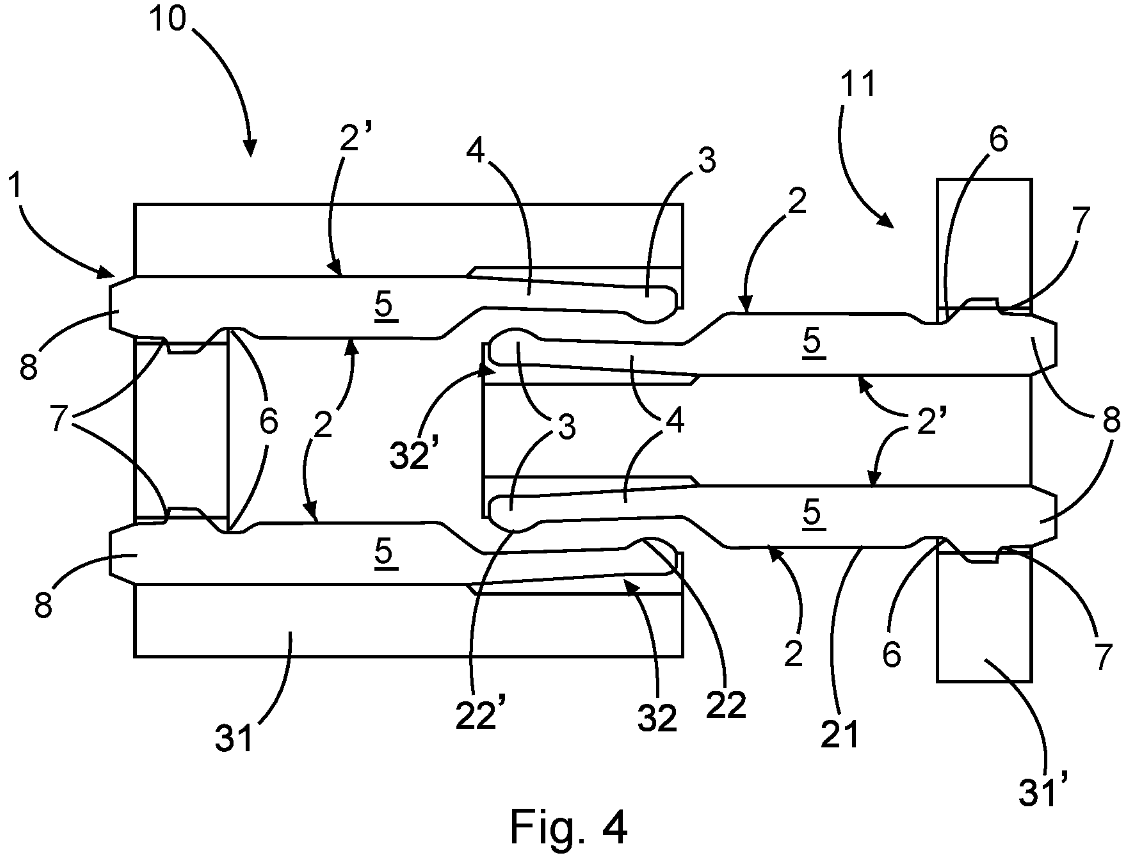
FIG. 4 shows a sectional depiction of two plug connectors with contact elements.

An exemplary use of a contact element 1 is shown in FIG. 4. The previously mentioned "female" plug connector 10 and "male" plug connector are each provided with two contact elements 1. The plug connectors 10 and 11 accommodate the contacts 1 ideally in a shape that can follow the contours of the narrow side 2'. An indentation 32, or 32', is provided in the region of the contact tip 3, allowing the contacts 1 to deflect during the plugging process.

Even though various aspects or features of the invention are each shown in combination in the figures, it is apparent to a person skilled in the art—unless otherwise indicated—that the combinations shown and discussed are not the only possible ones. In particular, corresponding units or feature complexes from different exemplary embodiments may be interchanged.

LIST OF REFERENCE SIGNS

- 1 contact element
- 2 narrow side
- 3 contact tip
- 4 flexible region
- 5 rigid region
- 6 concavity
- 7 protrusion
- 8 soldering region
- 9 recess
- 10 "female" plug connector
- 11 "male" plug connector
- 21 contact surface
- 22 contact crest
- 31 plug connector housing
- 32 indentation

The invention claimed is:

1. An electrical contact element (1) for use in a printed circuit board plug connector, comprising:

a stepped body having two opposing narrow sides (2, 2'), including a front narrow side (2), and a rear narrow side (2');

two opposing broad sides, the stepped body extending from a soldering region (8) at a bottom of the electrical contact element (1) to a contact tip (3);

a contact region (5) disposed above the soldering region (8);

a contact surface (21) formed on the front narrow side (2) along the contact region (5); and a flexible region (4) disposed above the contact region (5), the flexible region (4) including a contact crest (22) arranged on the contact tip (3), wherein the flexible region (4) is set back from the contact region (5) and connected thereto by a step, wherein the contact region (5) is cuboidal and extends generally parallel to a longitudinal axis of the electrical contact element (1), and wherein the flexible region (4) is cuboidal between the step and the contact tip (3) and extends along a flexible region axis at a forward slanted angle from the step to the contact tip (3), relative to the longitudinal axis of the electrical contact element (1).

2. The electrical contact element (1) as claimed in claim 1, wherein the front narrow side (2) is machined at least along part of the contact surface (21) using a mechanical, surface-treating process.

3. The electrical contact element (1) as claimed in claim 1, wherein the front narrow side (2) is machined by a forming process at least along part of the contact surface (21).

4. The electrical contact element (1) as claimed in claim 1, wherein the front narrow side (2) is machined by pressure polishing at least along part of the contact surface (21).

5. The electrical contact element (1) as claimed in claim 1, wherein the front narrow side (2) is machined at least along part of the contact surface (21) by a machining process.

6. The electrical contact element (1) as claimed in claim 1, wherein the contact tip (3) has a curvature.

7. The electrical contact element (1) as claimed in claim 1, wherein at least part of the contact tip (3) is machined using a mechanical, surface-treating process.

8. The electrical contact element (1) as claimed in claim 1, further comprising a concavity (6) formed between the latching hook (7) and the contact surface (21).

9. The electrical contact element (1) as claimed in claim 8, wherein the contact surface (21) has a width of less than or equal to 0.25 mm and is pressure polished.

10. The electrical contact element (1) as claimed in claim 1, further comprising a latching hook (7) extending from the front narrow side (2) between the soldering region (8) and the contact region (5).

* * * * *